United States Patent [19]

Harvey

[11] Patent Number: 4,668,064
[45] Date of Patent: May 26, 1987

[54] CAMERA APPARATUS FOR PREVENTING VERTICAL FLASH EXPOSURES WITH FLASH UNIT BELOW TAKING LENS

[75] Inventor: Donald M. Harvey, Webster, N.Y.

[73] Assignee: Eastman Kodak Company, Rochester, N.Y.

[21] Appl. No.: 818,165

[22] Filed: Jan. 13, 1986

[51] Int. Cl.$^4$ ............................................. G03B 15/03
[52] U.S. Cl. .................................................. 354/149.11
[58] Field of Search ............... 354/127.1, 127.11, 147, 354/149.11, 149.1, 149, 288, 289.1, 126, 129, 202, 219, 145.1, 266, 268

[56] References Cited

U.S. PATENT DOCUMENTS

| | | | |
|---|---|---|---|
| 2,996,966 | 8/1961 | Edgerton | 354/129 X |
| 3,120,791 | 2/1964 | Bundschuh et al. | 354/127.1 |
| 3,169,708 | 2/1965 | D'Incerti | 354/149.11 |
| 3,810,227 | 5/1974 | Tanaka | 354/266 X |
| 4,135,797 | 1/1979 | Ohmura | 354/128 |
| 4,239,360 | 12/1980 | Urano | 354/127.1 X |
| 4,322,148 | 3/1982 | Yoshikawa | 354/128 |
| 4,464,031 | 8/1984 | Iwashita | 354/173.1 |

FOREIGN PATENT DOCUMENTS 375479 7/1907 France ........................... 354/129

Primary Examiner—Donald A. Griffin
Attorney, Agent, or Firm—Roger A. Fields

[57] ABSTRACT

A photographic camera having a built-in flash unit is improved by providing integral apparatus which prevents operation of the flash unit in the event the camera is oriented vertically with the flash unit below the taking lens. This is done to prevent the subject being photographed from taking on an unnatural upward shadow as a result of flash illumination of the subject with the flash unit below the taking lens. Preferably, the apparatus prevents operation of the flash unit by disabling a shutter release, and includes an indicator visible in a viewfinder window to alert the user that the camera is improperly oriented for taking a vertical flash exposure.

7 Claims, 5 Drawing Figures

CAMERA APPARATUS FOR PREVENTING VERTICAL FLASH EXPOSURES WITH FLASH UNIT BELOW TAKING LENS

BACKGROUND OF THE INVENTION

1. Field of the Invention

The invention relates generally to photographic cameras and in particular to those cameras in which a flash unit operates to illuminate a subject during picture-taking. More particularly, the invention relates to camera apparatus for preventing vertical flash exposures with the flash unit below the taking lens.

2. Description oF the Prior Art

Recently, it has become commonplace to build an electronic flash unit into a camera. Many of the cameras with a built-in flash unit that are available today are compact in size and relatively inexpensive. These attributes have allowed such cameras to become popular even with novice users. Thus there is a need to make the cameras as foolproof as possible.

When a camera with a built-in flash unit is oriented for taking a vertical exposure and the flash unit is operated to illuminate the subject, it is preferable to locate the flash unit above the taking lens. If inadvertently the camera is held with the flash unit below the taking lens, flash illumination of the subject will cause the subject to take on an unnatural upward shadow. This is especially noticeable when the subject includes a person's face. In this instance, the person's face will take on an eerie or ghoulish appearance.

SUMMARY OF THE INVENTION

The above-described problem regarding vertical flash exposures is believed to be solved by the invention. Simply stated, the invention is an improvement which in response to vertical orientation of the camera with the flash unit below the taking lens prevents operation of the flash unit to illuminate the subject. Optionally, an indicator may be located in the viewfinder window of the camera to alert the user that the camera is improperly oriented for taking a vertical flash exposure.

More particularly, the invention includes dual mode means having a normal mode for not interfering with operation of the flash unit and a disabling mode for preventing operation of the flash unit. Control means act in response to vertical orientation of the camera with the flash unit below the taking lens to change the dual mode means from its normal mode to its disabling mode, provided the flash unit is in a flash (active) mode. If, therefore, the flash unit is in its flash mode and the camera is improperly oriented for taking a vertical flash exposure, operation of the flash unit will be prevented. This can be done, for example, by disabling the shutter release in the camera.

Thus, according to the invention, it is not possible to take a vertical flash exposure with the flash unit below the taking lens. It is possible, however, to take a vertical ambient (non-flash) exposure with the camera in that orientation.

DESCRIPTION OF THE PREFERRED EMBODIMENT

The invention is disclosed as being embodied preferably in a 35 mm camera having a built-in electronic flas unit. Because such a photographic camera and flash unit are well known, this description is directed in particular to camera and flash elements forming part of or cooperating directly with the disclosed embodiment. It is to be understood, however, that camera and flash elements not specifically shown or described may take various forms known to persons of ordinary skill in the art.

Figure 5:
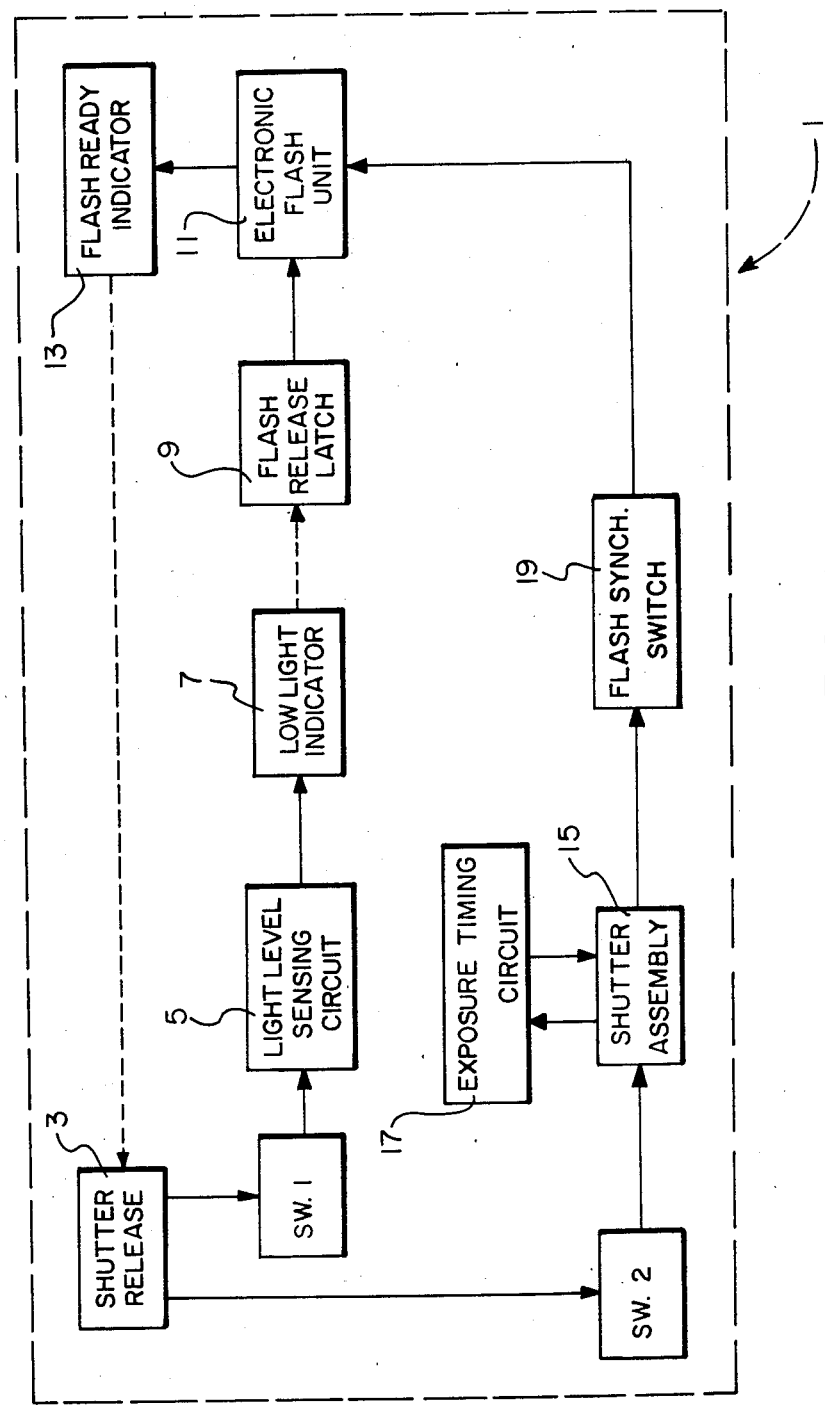
FIG. 5 is a schematic representation of typical functions in the camera during picture-taking.

Referring now to the drawings, FIG. 5 is a schematic representation of typical functions in a 35 mm camera 1 during picture-taking. When a shutter release 3 is initially depressed by a user's finger pressure, a normally open switch SW. 1 is closed, thereby energizing a conventional light-level sensing circuit 5, such as the one disclosed in U.S. Pat. No 4,16o,588. If ambient light reflected from a subject to be photographed is too low for an acceptable exposure, the energized circuit 5 causes a low light indicator 7, e.g., a lamp, to alert the user that flash illumination of the subject is necessary. In this instance, the user would activate a flash release latch 9 to release a conventional pop-up (extensible) type electronic flash unit 11. A normally open switch, not shown, closes in response to movement of the flash unit 11 from a retracted position, shown in FIGS. 1 and 2, to an extended position, shown in FIG. 3, to energize the flash unit. A flash ready indicator 13, e.g., a light-emitting diode, alerts the user that the flash unit 11 is energized. While not shown, in a typical flash circuit for the flash unit 11, a capacitor is connected across opposite end terminals of an electronic flash tube. The resistance of the gas in the tube is normally too high to permit a direct discharge. For firing the flash there is a third electrode—usually a coil of wire wound round the outside of the tube. An instantaneous triggering voltage applied to this electrode ionizes the gas in the tube, thus lowering its resistance and allowing the capacitor to discharge its energy through the tube in the form of a brilliant flash of light. The triggering voltage can be supplied by a small induction coil picked off a potentiometer across the main capacitor.

Continued depression of the shutter release 3 after the flash ready indicator 13 has indicated that the flash unit 11 is energized closes a normally open switch SW.2. The closed switch SW.2 causes an electromagnetic latch, not shown, to be actuated, thereby permitting opening movement of a conventional dual blade shutter assembly 15, such as the one disclosed in U.S. Pat. No. 4,493,547. Opening movement of the shutter assembly 15 in turn causes a conventional exposure timing circuit 17 to be energized. While not shown, the basic components of the exposure timing circuit 17 are typically a capacitor and a photoconductor. The photoconductor is disposed to receive ambient light reflected from the subject to be photographed and has a resistance that varies in inverse proportion to the intensity of such incident light. When the timing circuit 17 is energized in response to opening movement of the shutter assembly 15, the capacitor begins to charge at a rate inversely proportional to the product of its capacitance and the resistance of the photoconductor. Charging of the capacitor to a particular level actuates an electromagnetic latch, not shown, permitting the shutter assembly 15 to start its closing movement. If the light intensity falling on the photoconductor is high, the charging period of the capacitor—and hence the interval between shutter opening and shutter closing - is comparatively short. In low light, however, the resistance of the photoconductor increases and the capacitor takes longer to charge, which leads to a longer exposure time.

With opening movement of the shutter assembly 15, a flash synchronization switch 19 controlled by the shutter assembly triggers the electronic flash unit 11 to provide flash illumination of the subject being photographed. The electronic flash unit 11, as is typical, has a very short duration light output on the order of a millisecond and reaches peak light intensity almost immediately. Therefore, the flash unit 11 is fired after the shutter assembly 15 is actuated to assure that the shutter assembly is opened before flash ignition.

When amibient light reflected from a subject to be photographed is sufficient for an acceptable exposure without flash illumination of the subject, initial depression of the shutter release 3 to close the switch SW.1 does not cause energization of the low light indicator 7. In this instance, therefore, the user can immediately continue to depress the shutter release 3 until the switch SW.2 is closed, thereby sequencing the camera 1 to take an exposure without wiring the flash unit 11.

According to the invention, the flash unit 11 is prevented from operating to illuminate the subject should the camera be oriented vertically with the flash unit below, i.e., lower than, a taking lens 21 of the camera. This is done to prevent the subject from taking on an unnatural upward shadow as a result of flash illumination of the subject with the camera in the improper vertical orientation.

Figure 1:
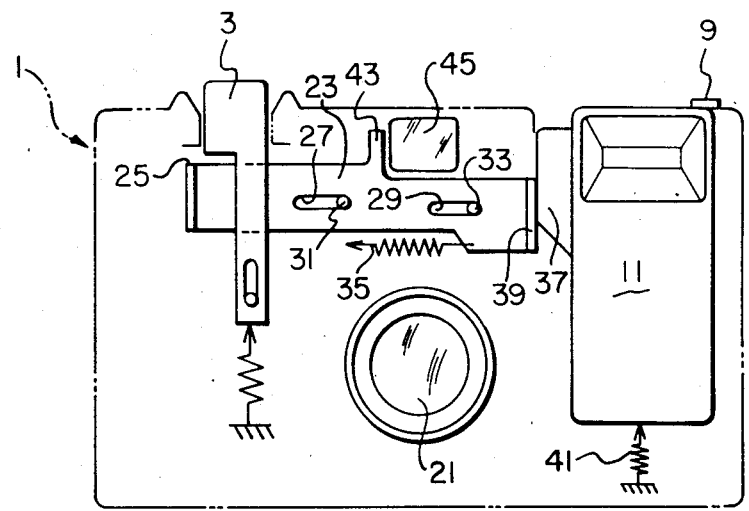
FIG. 1 is a front elevation view of a camera having apparatus for preventing vertical flash exposures with the flash unit below the taking lens, according to a preferred embodiment of the invention.
Figure 2:
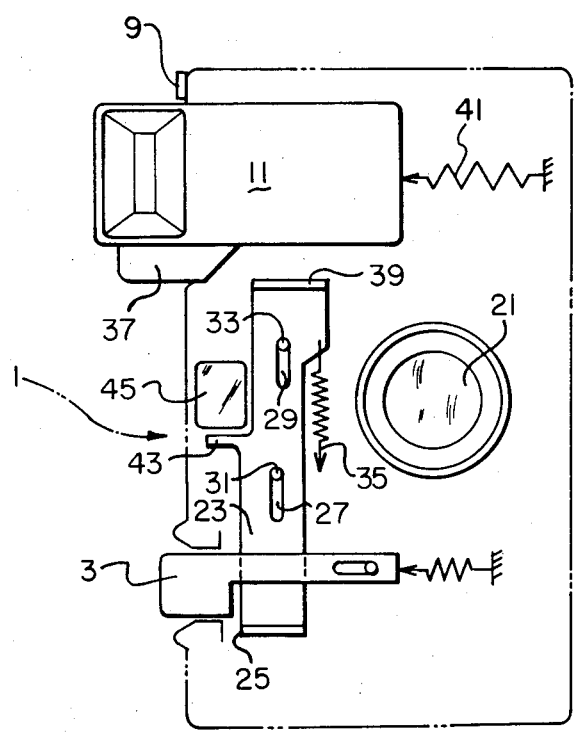
FIG. 2 is a front elevation view of the camera correctly oriented in a vertical sense with the flash unit above the taking lens.
Figure 3:
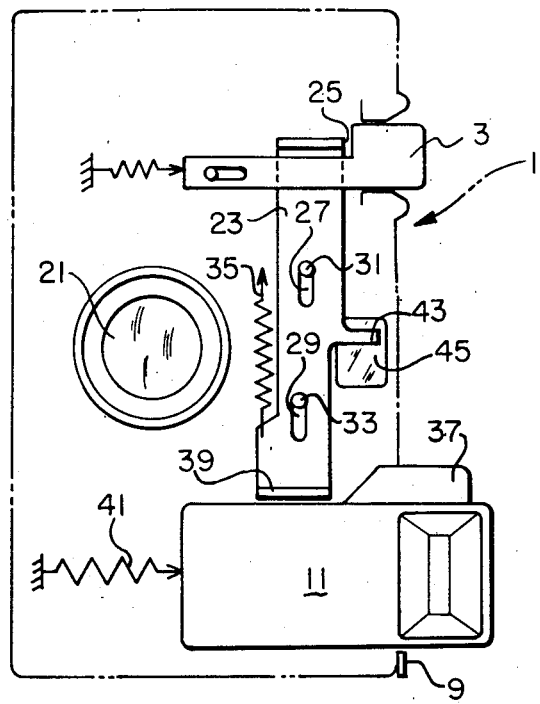
FIG. 3 is a front elevation view of the camera improperly oriented in a vertical sense with the flash unit below the taking lens.

As shown in FIG. 3, a bar 23 includes a blocking tab 25 for blocking depression of the shutter release 3 to prevent operation of the flash unit 11 in its extended position when the camera 1 is oriented with the flash unit below the taking lens 21. A pair of slots 27 and 29 cut in the bar 23 receive respective fixed pins 31 and 33, which project crosswise through the slots. The slots 27, 29 and the pins 31, 33 cooperate to support the bar 23 for translation to the right, as shown in FIG. 1, against the contrary urging of a return spring 35. The bar 23 is supported for translation between a normal position, shown in FIGS. 1 and 2, in which its blocking tab 25 does not interfere with depression of the shutter release 3 and a blocking position, shown in FIG. 3, in which the blocking tab blocks depression of the shutter release. A ramp 37 is disposed on the flash unit 11 for retaining the bar 23 in its normal position by abutting against an end tab 39 of the bar when the flash unit is in its retracted position, as shown in FIG. 1. However, when the flash release latch 9 is actuated to release the flash unit 11 and the flash unit is urged by a tension spring 41 to its extended position, the ramp 37 will move clear of the end tab 39, permitting movement of the bar 23 to its blocking position. The bar 23 does not move to its blocking position unless the camera 1 is oriented vertically with the flash unit 11 below the taking lens 21, as shown in FIG. 3. To accomplish this movement, the bar 23 is heavier than its return spring 35 and, therefore, will move under the influence of gravity to the blocking position. Thus, as long as the camera 1 is in the improper vertical orientation and the flash unit 11 is in its extended position, depression of the shutter release to trigger the flash unit 11 is prevented. Of course, when the flash unit 11 is in its retracted position for taking pictures using only ambient light, the bar 23 will remain in its normal position regardless of vertical orientation of the camera with the flash unit below the taking lens 21.

Figure 4:
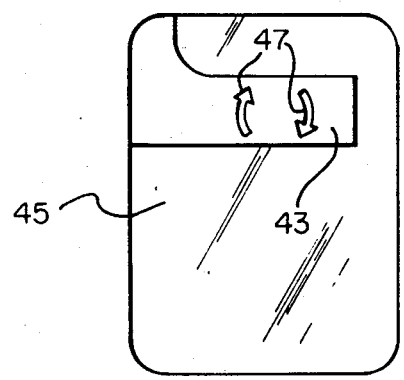
FIG. 4 is a front elevation view of an indicator in the viewfinder window of the camera for alerting the user that the camera is improperly oriented for taking a vertical flash exposure.

Optionally, an indicator 43 may be provided on the bar 23 which will move into a viewfinder window 45 of the camera 1 when the bar is moved to its blocking position. The indicator 43, as shown in FIG. 4, has a pair of cut-outs 47 which define respective arrows for alerting the user that the camera 1 is improperly oriented for taking a vertical flash exposure.

The invention has been described in detail with particular reference to a preferred embodiment thereof, but it will be understood that variations and modifications can be effected within the spirit and scope of the invention. For example, the invention could be utilized in a camera having a fixed position flash unit, rather than the pop-up flash unit in the preferred embodiment.

I claim:

1. An improved photographic camera of the type wherein (a) a flash unit operates to illuminate a subject during picture-taking and (b) a taking lens forms an image of the subject, and wherein the improvement comprises:
   means, responsive to vertical orientation of said camera with said flash unit lower than said taking lens, for preventing operation of the flash unit to illuminate the subject, but permitting operation of said flash unit whenever said camera is oriented vertically with the flash unit higher than said taking lens.

2. An improved photographic camera of the type wherein (a) a built-in flash unit has a flash mode of operation for illuminating a subject during picture-taking and (b) a taking lens forms an image of the subject, and wherein the improvement comprises:
   dual mode means changeable from a normal mode for not interfering with operation of said flash unit to a disabling mode for preventing operation of the flash unit; and
   control means, responsive to vertical orientation of said camera with said flash unit lower than said taking lens, for changing said dual mode means from its normal mode to its disabling mode provided the flash unit is in its flash mode.

3. An improved photographic camera of the type wherein (a) a built-in flash unit has a flash mode of operation for illuminating a subject during picture-taking (b) a taking lens forms an image of the subject, and (c) a shutter release operates said flash unit in its flash mode, and wherein the improvement comprises:
   means, responsive to vertical orientation of said camera with said flash unit lower than said taking lens, for disabling said shutter release provided the flash unit in its flash mode.

4. An improved photographic camera of the type wherein (a) a built-in flash unit has a flash mode of operation for illuminating a subject during picture-taking, (b) a taking lens forms an image of the subject, and (c) a shutter release is movable to operate said flash unit in its flash mode, and where the improvement comprises:

dual mode means changeable from a normal mode not interfering with movement of said shutter release to a disabling mode for blocking movement of the shutter release; and control means, responsive to vertical orientation of said camera with said flash unit lower than said taking lens, for changing said dual mode means from its normal mode to its disabling mode provided the flash unit is in its flash mode.

5. An improved photographic camera of the type wherein (a) a built-in flash unit has a flash mode of operation for illuminating a subject during picture-taking, (b) a taking lens forms an image of the subject, and (c) a viewfinder has a window for viewing the subject, and wherein the improvement comprises:

means, responsive to vertical orientation of said camera with said flash unit lower than said taking lens, for preventing operation of the flash unit illuminate the subject; and means for indicating in said viewfinder window that the camera is oriented vertically with the flash unit lower than the taking lens provided said flash unit is in its flash mode.

6. An improved photographic camera of the type wherein (a) a built-in flash unit is movable from a retracted position for picture-taking without flash illumination of a subject to an extended position for picture-taking with flash illumination of the subject, (b) a taking lens forms an image of the subject, and (c) a shutter release is movable to operate said flash unit in its extended position, and wherein the improvement comprises:

a blocking element for blocking movement of said shutter release to prevent operation of said flash in its extended position;

means supporting said blocking element for translation from a normal position not interfering with movement of said shutter release to a blocking position for blocking movement of said shutter release, in response to vertical orientation of said camera with said flash unit lower than said taking lens; and means disposed on said flash unit for retaining said blocking element in its normal position when the flash unit is in its retracted position and releasing said blocking member when the flash unit is in its extended position.

7. The improvement as recited in claim 6, wherein said supporting means supports said blocking element for translation from its normal position to its blocking position under the influence of gravity.

* * * * *